Figure 1:
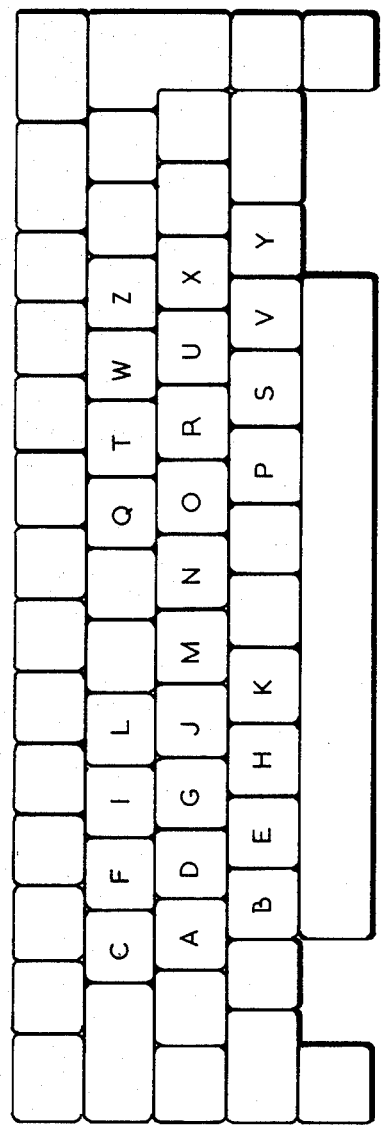

United States Patent [19]

Gardner

[11] Patent Number: 4,519,721

[45] Date of Patent: May 28, 1985

[54] TYPEWRITER KEYBOARD LAYOUT

[76] Inventor: Kathleen E. Gardner, 73 Macclesfield Old Rd., Burbage, Buxton, England

[21] Appl. No.: 510,880

[22] Filed: Jul. 5, 1983

[30] Foreign Application Priority Data

Jul. 3, 1982 [GB] United Kingdom ............... 8219299
Dec. 30, 1982 [GB] United Kingdom ............... 8236975

[51] Int. Cl.³ .............................................. B41J 5/10
[52] U.S. Cl. ..................................... 400/472; 400/486
[58] Field of Search .............. 400/486, 482, 489, 472, 400/91, 92; 340/365

[56] References Cited

U.S. PATENT DOCUMENTS 1,342,244  6/1920  Wolcott ............................ 400/486
2,040,248  5/1936  Dvorak et al. ..................... 400/486
3,847,263  11/1974 X ..................................... 400/486

FOREIGN PATENT DOCUMENTS 194331  1/1908  Fed. Rep. of Germany ...... 400/486

Primary Examiner—Edgar S. Burr
Assistant Examiner—Moshe I. Cohen
Attorney, Agent, or Firm—Pravel, Gambrell, Hewitt & Kimball

[57] ABSTRACT

A typewriter comprising a keyboard having a plurality of keys divided into three substantially horizontal rows, between which keys letters of the alphabet are allocated, and means operative by said keys to write the letters of the alphabet. The first key, from left to right, of the middle row, operable by the little finger of the left hand of an operator, is allocated the letter A. The sixth key, from left to right, of the middle row is allocated the letter N. Four keys in each of the top, middle and bottom rows of keys between the keys carrying the letters A and N, are allocated respectively, the first, second or third letter of each group of three letters between the letters A and N, in alphabetical sequence from left to right across the three rows of four keys. Finally, four keys in each of the top, middle and bottom rows of keys following the letter N are allocated, respectively, the first, second or third letter of each group of three letters after the letter N, in alphabetical sequence from left to right across the three rows of four keys, the row carrying each third letter of each group of three letters after the letter N being positioned such that the key carrying the letter Z is operable by the little finger of the right hand of an operator.

2 Claims, 2 Drawing Figures

TYPEWRITER KEYBOARD LAYOUT

The present invention relates to typewriters, and, in particular, to an improved keyboard layout for use therein.

Conventional typewriter keyboards comprise the "QWERTY" keyboard layout, which was originally devised to prevent jamming together of the arms carrying the typeface in old shift bar typewriters by spacing apart commonly used letters of the alphabet. However, whilst in modern typewriters this is no longer a problem, the "QWERTY" keyboard layout has been retained as the standard and with it have been retained various problems associated with it.

With the "QWERTY" keyboard layout the positions of the keys carrying letters of the alphabet is particularly difficult to recall quickly and accurately, which means that much of the time taken to train a person to type is spent simply in teaching the keyboard layout.

In addition, in the "QWERTY" keyboard layout the most frequently used keys carrying letters of the alphabet are not evenly distributed between the two hands of the typist which means that it is not possible to easily attain rapid typing speeds.

Yet a further disadvantage of the "QWERTY" keyboard layout is that the vowels do not follow the normally remembered sequence of A, E, I, O and U from left to right across the keyboard, instead, following the sequence A, E, U, I, O. This can further increase the time taken to learn the keyboard, and can reduce a typists speed.

Finally, the "QWERTY" keyboard layout does not take account of the anatomy of the human hand, in that in designing the "QWERTY" keyboard layout it was not appreciated that the third finger and the little finger of each hand share a common tendon, which makes use of the little finger independantly of the third finger difficult. In the "QWERTY" keyboard layout the little finger of both hands is required to operate keys which carry commonly used characters, that is Q, A and Z in the left hand and P, semi-colon and full stop in the right hand, which further reduces a typists speed.

It is an object of the present invention to provide a typewriter having a keyboard layout in which the abovementioned problems are obviated or mitigated, and in which use of the little finger of each hand, especially, can be minimised.

According to the present invention there is provided a typewriter comprising a keyboard having a plurality of keys divided into three substantially horizontal rows, between which keys letters of the alphabet are allocated, and means operative by said keys to write the letters of the alphabet, wherein the first key, from left to right, of the middle row, operable by the little finger of the left hand of an operator, is allocated the letter A, the sixth key, from left to right, of the middle row is allocated the letter N, four keys in each of the top, middle and bottom rows of keys, between the keys carrying the letters A and N, being allocated, respectively, the first, second or third letter of each group of three letters between the letters A and N, in alphabetical sequence from left to right across the three rows of four keys and four keys in each of the top, middle and bottom rows of keys following the letter N being allocated, respectively, the first second or third letter of each group of three letters after the letter N, in alphabetical sequence from left to right across the three rows of four keys, the row carrying each third letter of each group of three letters after the letter N being positioned such that the key carrying the letter Z is operable by the little finger of the right hand of an operator.

Preferably each of said three rows of keys comprises ten keys, and the two keys provided in the top and the bottom row not carrying letters of the alphabet carry punctuation marks or other typewriter keyboard characters.

The said two keys in both the top and the bottom rows may be located above and below the keys carrying the letters M and N or alternatively above and below the keys carrying the letters A and Z.

Figure 2:
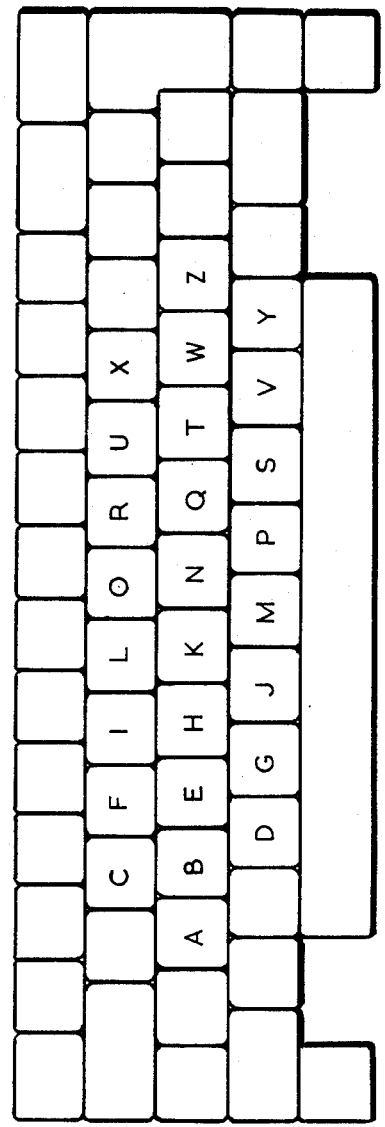

Embodiments of the present invention will now be described, by way of example, with reference to to accompanying drawings, in which:

FIG. 1 shows a word processor keyboard in which only keys carrying letters of the alphabet are labelled according to a first embodiment of the present invention; and FIG. 2 shows a word processor keyboard in which only keys carrying letters of the alphabet are labelled according to a second embodiment of the present invention.

In both FIG. 1 and FIG. 2 there is shown a word processor keyboard in which only keys carrying letters of the alphabet are labelled to facilitate explanation of the present invention. The blank keys of the keyboard carry conventional keyboard characters other than letters of the alphabet and word processor operational instructions which are arranged in any convenient arrangement. In conventional manner each of the keys, when depressed, causes the symbol thereon to be typed or the instruction thereon to be acted upon.

The arrangement of the letters of the alphabet is such that they follow an easily recognisable and remembered pattern, in which the twenty-six letters of the alphabet are evenly divided between the two hands of an operator, the keys up to and including the letter M being operated by the left hand, and the remaining keys being operated by the right hand.

Referring now to FIG. 1, the pattern of letters of the alphabet on the keys of the keyboard commences with the letter A on the far left hand key of the middle row, with the letters B and C occupying the keys directly below and above, respectively, and concludes with the letter X on the far right hand key of the middle row, with the letters Y and Z occupying the keys directly below and above, respectively. The keys A, B and C are operated by the little finger of the left hand, whilst the keys X, Y and Z are operated by the little finger of the right hand. In this respect, this embodiment of the present invention is similar to the "QWERTY" keyboard layout in that the little finger of each hand is required to operate three keys carrying commonly used symbols of the keyboard. However, as will become apparent hereinbelow, this embodiment of the present invention still has significant advantage over the "QWERTY" keyboard layout.

Between the keys A, B and C and the keys X, Y and Z this pattern of the first letter of each subsequent group of three letters of the alphabet occupying the key in the middle row, the second letter the key of the bottom row, and the third letter the key of the top row is repeated across the keyboard except for the letters M and N which occupy the two keys at the centre of the middle row of the keyboard, and above and below which two blank keys are provided which may be allocated punctuation characters, for example, full stop, comma, question mark and semi-colon.

It will be appreciated that the ordered sequence of letters across the word processor keyboard described hereinabove makes memorising the positions of the letters of the alphabet very simple, which reduces keyboard training time. In addition, it will be seen that the vowels follow the easily remembered sequence of A, E, I, O and U from left to right across the keyboard, with the letter A occupying the natural first position in the keyboard. Further the letter Z, the last letter of the alphabet, is operated by the little finger of the right hand and as such occupies the natural last position in the keyboard.

Finally, it should be appreciated that the three groups of four letters occupying the keys in the bottom, middle and top rows of the keyboard between the letters A and N, may be interchanged, as may the three groups of four letters occupying the keys in the bottom, middle and top rows of the keyboard after the letter N, whilst, still retaining the abovementioned advantageous features.

Referrring now to FIG. 2, the letters of the alphabet allocated to the keys of the top and bottom rows of the keyboard are not separated from each other by two blank keys as in the embodiment of FIG. 1. Instead, the two blank keys in the top and bottom rows occupy positions above and below the keys carrying the letters A and Z. The advantage of this arrangement is that the work done by the little finger of each hand is considerably reduced, as each is required to operate only one key carrying a letter of the alphabet, that is the letter A in the left hand and the letter Z in the right hand.

Whilst the sequence of letters in the keyboard of FIG. 2 may not be as apparent as in the keyboard of FIG. 1, it nevertheless follows the same rules, in that the first, second, and third letter of each group of three letters of the alphabet, between the letters A and N, is each allocated to a respective one of the keys in the bottom, middle or top rows of the keyboard and the first and second letter of each group of three letters of the alphabet after the letter N is each allocated to a respective one of the keys in the bottom and top rows of the keyboard, whilst the third letter of each group is allocated to the middle row of keys, so that the letter Z occupies a position where it can be operated by the little finger of the right hand of an operator.

As in the embodiment of FIG. 1 it will be appreciated that the ordered sequence of letters across the word processor keyboard described with reference to FIG. 2 makes memorising the positions of the letters of the alphabet very simple, which reduces keyboard training time. Also, the vowels follow the easily remembered sequence A, E, I, O and U from left to right across the keyboard, with the letters A and Z occupying, respectively, the natural first and last positions on the keyboard.

Finally, it will be appreciated that the term "typewriter" is intended to cover any equipment making use of a keyboard to type written information, for example mechanical and electrical typewriters, computers, calculators and word processors.

I claim:

1. A typewriter comprising a keyboard having a plurality of keys divided into three substantially horizontal rows, between which keys letters of the alphabet are allocated, and means operative by the keys to write the letters of the alphabet, wherein the twenty six alphabet letter keys are divided into a middle row of ten keys and a top row and a bottom row each of eight keys, and wherein the first key, from left to right, of the middle row is the only alphabet letter key required to be operated by the little finger of the left hand of the operator, is allocated the letter A, and the last key, from left to right, of the middle row, is the only alphabet letter key required to be operated by the little finger of the right hand of the operator, is allocated the letter Z, with the keys being arranged in two group of thirteen with the keys in the left hand group being allocated the letters A to M and the keys in the right hand group being allocated the letters N to Z, and the middle eight keys of the middle row defining with the eight keys in each of the top and bottom rows eight groups of three keys arranged from left to right between the first and last keys of the middle row and with the first group adjacent the first key of the middle row allocated the letter A being allocated the first three letters of the alphabet following the letter A and each subsequent group of three keys, from left to right, being allocated the next three letters of the alphabet following the last letter of the alphabet in the immediately preceding group with the most frequently used letters E T A N H all being allocated to keys in the middle row and certain of the next most frequently used letters I O S R L being allocated to keys normally stroked by the right or the left index finger of the operator.

2. A typewriter according to claim 1, characterised in that two additional keys are placed in both the top and the bottom rows of the keyboard located at opposite ends above and below said keys carrying the letters A and Z.

* * * * *